United States Patent
Aflatouni et al.

(10) Patent No.: US 11,249,369 B2
(45) Date of Patent: Feb. 15, 2022

(54) INTEGRATED OPTICAL PHASED ARRAYS WITH OPTICALLY ENHANCED ELEMENTS

(71) Applicant: California Institute of Technology, Pasadena, CA (US)

(72) Inventors: Firooz Aflatouni, Philadelphia, PA (US); Seyed Ali Hajimiri, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 15/728,245

(22) Filed: Oct. 9, 2017

(65) Prior Publication Data

US 2018/0101083 A1     Apr. 12, 2018

Related U.S. Application Data

(60) Provisional application No. 62/405,423, filed on Oct. 7, 2016.

(51) Int. Cl.
*G02F 1/29*      (2006.01)

(52) U.S. Cl.
CPC .............. *G02F 1/292* (2013.01); *G02F 1/293* (2013.01); *G02F 2203/24* (2013.01)

(58) Field of Classification Search
None
See application file for complete search history.

(56) References Cited

U.S. PATENT DOCUMENTS

| | | |
|---|---|---|
| 4,686,533 A | 8/1987 | MacDonald et al. |
| 4,833,336 A | 5/1989 | Kraske |
| 6,424,442 B1 | 7/2002 | Gfeller et al. |
| 6,894,550 B2 | 5/2005 | Trosa et al. |
| 7,313,295 B2 | 12/2007 | Ghandi et al. |

(Continued)

FOREIGN PATENT DOCUMENTS

| | | |
|---|---|---|
| EP | 3094987 B1 | 12/2018 |
| WO | WO 2018/148758 A1 | 8/2018 |
| WO | WO 2018/165633 A1 | 9/2018 |

OTHER PUBLICATIONS

U.S. Appl. No. 15/616,844, Non-Finai Office Action dated Jun. 1, 2018.

(Continued)

*Primary Examiner* — Robert E. Tallman
(74) *Attorney, Agent, or Firm* — Ardeshir Tabibi; Weaver Austin Villeneuve & Sampson LLP

(57) ABSTRACT

An optical phased array includes, in part, N optical signal emitting elements, and N lenses each associated with a different one of the N optical signal emitting elements and positioned to form an image of its associated signal emitting element, where N is an integer greater than 1. The optical signal emitting elements may be a grating coupler, an edge coupler, and the like. At least a number of the lenses may be formed from Silicon. The optical phased array may optionally include one or more concave or convex lens positioned between the signal emitting elements and the N lenses. The optical signal emitting elements may be formed in a silicon dioxide layer formed above a semiconductor substrate and the lenses may be formed from Silicon disposed above the silicon dioxide layer. The optical signal emitting elements may receive an optical signal generated by the same source.

14 Claims, 6 Drawing Sheets

(56) References Cited

U.S. PATENT DOCUMENTS

| | | |
|---|---|---|
| 7,539,418 B1 | 5/2009 | Krishnamoorthy et al. |
| 7,623,783 B2 | 11/2009 | Morris et al. |
| 8,244,134 B2 | 8/2012 | Santori et al. |
| 8,311,417 B1 | 11/2012 | Poggiolini et al. |
| 9,325,419 B1 | 4/2016 | Kato |
| 9,557,585 B1* | 1/2017 | Yap ................... G02F 1/025 |
| 10,382,140 B2 | 8/2019 | Fatemi et al. |
| 10,795,188 B2 | 10/2020 | Aflatouni et al. |
| 2002/0174660 A1 | 11/2002 | Venkatasubramanian |
| 2002/0181058 A1 | 12/2002 | Ger et al. |
| 2003/0090775 A1 | 5/2003 | Webb et al. |
| 2004/0071386 A1 | 4/2004 | Nunen et al. |
| 2004/0101227 A1 | 5/2004 | Takabayashi et al. |
| 2004/0141753 A1 | 7/2004 | Andreu-von Euw et al. |
| 2005/0084213 A1 | 4/2005 | Hamann et al. |
| 2005/0138934 A1 | 6/2005 | Weigert et al. |
| 2006/0034609 A1 | 2/2006 | Morris et al. |
| 2006/0056845 A1 | 3/2006 | Parsons et al. |
| 2008/0111755 A1 | 5/2008 | Haziza et al. |
| 2008/0181550 A1 | 7/2008 | Earnshaw |
| 2009/0297092 A1 | 12/2009 | Takahashi |
| 2010/0054653 A1 | 3/2010 | Carothers |
| 2010/0158521 A1 | 6/2010 | Doerr et al. |
| 2010/0187402 A1* | 7/2010 | Hochberg ......... H01L 27/14621 250/208.1 |
| 2010/0226658 A1 | 9/2010 | Fujimoto et al. |
| 2011/0052114 A1* | 3/2011 | Bernasconi ............... H01S 5/50 385/3 |
| 2011/0064415 A1 | 3/2011 | Williams et al. |
| 2012/0087613 A1 | 4/2012 | Rasras |
| 2012/0207428 A1 | 8/2012 | Roelkens |
| 2012/0213531 A1 | 8/2012 | Nazarathy et al. |
| 2013/0107667 A1 | 5/2013 | Boufounos |
| 2015/0009068 A1 | 1/2015 | Gregoire et al. |
| 2015/0198713 A1 | 7/2015 | Boufounos et al. |
| 2015/0336097 A1 | 11/2015 | Wang et al. |
| 2015/0357710 A1 | 12/2015 | Li et al. |
| 2016/0170141 A1 | 6/2016 | Luo et al. |
| 2016/0172767 A1 | 6/2016 | Ray |
| 2016/0266414 A1 | 9/2016 | Gill et al. |
| 2016/0276803 A1 | 9/2016 | Uesaka |
| 2016/0285172 A1 | 9/2016 | Kishigami et al. |
| 2017/0041068 A1 | 2/2017 | Murakowski et al. |
| 2017/0131576 A1 | 5/2017 | Gill et al. |
| 2017/0279537 A1* | 9/2017 | Kim ................... H01S 5/021 |
| 2017/0315387 A1 | 11/2017 | Watts et al. |
| 2017/0324162 A1 | 11/2017 | Khachaturian et al. |
| 2018/0123699 A1 | 5/2018 | Fatemi et al. |
| 2018/0101032 A1 | 6/2018 | Aflatouni et al. |
| 2018/0173025 A1 | 6/2018 | McGreer et al. |
| 2019/0056499 A1 | 2/2019 | Fatemi et al. |
| 2019/0089460 A1 | 3/2019 | Khachaturian et al. |

OTHER PUBLICATIONS

WIPO Application No. PCT/US2018/018070, PCT International Search Report and Written Opinion of the International Searching Authority dated Apr. 27, 2018.

WIPO Application No. PCT US2018/021882, PCT International Search Report and Written Opinion of the International Searching Authority dated Jun. 7, 2018.

U.S. Appl. No. 15/728,329, Non-Final Office Action dated Jan. 19, 2018.

U.S. Appl. No. 15/728,329, Response to Final Office Action filed Jan. 16, 2019.

U.S. Appl. No. 15/616,844, Response to Non-Final Office Action filed Dec. 3, 2018.

U.S. Appl. No. 15/728,329, Final Office Action dated Aug. 3, 2018.

U.S. Appl. No. 15/728,329, Response to Non-Final Office Action filed Jul. 18, 2018.

U.S. Appl. No. 15/587,391, Non-Final Office Action dated Dec. 13, 2018.

Bliss, et al., "Muitipie-Input Multiple-Output (MIMO) Radar and Imaging: Degrees of Freedom and Resolution," *Signals, Systems, and Computers (Asilomar) Conference*, pp. 54-59, (2003).

Bogaerts, et al., "Low-loss, low-cross-talk crossings for silicon-on-insulator nanophotonic waveguides," *Optics Letters*, 32(19): 2801-2803, (2007).

Katz, et al., "Diffraction coupled phase-locked semiconductor laser array," *Appl. Phys. Lett.*, 42(7): 554-556, (1983).

Liang, et al., "Tiled-aperture coherent beam combining using optical phase-lock loops," *Electronics Letters*, 44(14), (2008).

Resler, et al., "High-efficiency liquid-crystal optical phased-array beam steering," *Opt. Lett.*, 21(9): 689-691, (1996).

Vaidyanathan, et al., "Sparse sensing with coprime arrays," *Signals, Systems, and Computers (Asilomar) Conference*, pp. 1405-1409, (2010).

U.S. Appl. No. 15/728,329, Non-Final Office Action dated Jan. 30, 2019.

U.S. Appl. No. 15/587,391, Final Office Action dated Aug. 15, 2019.

U.S. Appl. No. 15/616,844, Notice of Allowance dated Mar. 27, 2019.

U.S. Appl. No. 15/728,329, Non-Final Office Action dated Sep. 9, 2019.

U.S. Appl. No. 15/917,536, Non-Final Office Action dated Aug. 7, 2019.

U.S. Appl. No. 15/917,536, Requirement for Restriction/Election dated Feb. 11, 2019.

WIPO Application No. PCT/US2018/018070, PCT International Preliminary Report on Patentability dated Aug. 13, 2019.

WIPO Application No. PCT/US2018/021882, PCT International Preliminary Report on Patentability dated Sep. 10, 2019.

U.S. Appl. No. 15/587,391, Non-Final Office Action dated Mar. 19, 2020.

U.S. Appl. No. 15/896,005, Ex Parte Quayle Action mailed Apr. 29, 2020.

U.S. Appl. No. 15/917,536, Final Office Action dated May 14, 2020.

U.S. Appl. No. 15/728,329, Notice of Allowance dated Jun. 12, 2020.

EP 18764449.7 Extended Suroepean Search Report dated Nov. 24, 2020.

U.S. Appl. No. 15/971,536, Non-Final Office Action dated Nov. 25, 2020.

* cited by examiner

INTEGRATED OPTICAL PHASED ARRAYS WITH OPTICALLY ENHANCED ELEMENTS

CROSS REFERENCE TO RELATED APPLICATIONS

The present application claims benefit under 35 U.S.C. 119 (e) of U.S. provisional application No. 62/405,423, filed Oct. 7, 2016, entitled "Integrated Optical Phased Arrays with Optically Enhanced Elements", the content of which is incorporated herein by reference in its entirety.

FIELD OF THE INVENTION

The present invention is related to phased arrays, and more particularly to an integrated optical phase array.

BACKGROUND OF THE INVENTION

Optical storage devices such as CD ROMs benefit from a compact high resolution optical beam steering array. Other examples of existing and emerging applications for optical phased arrays include Light Detection and Ranging (LIDAR), optical radar, free space optical communication (including deep space communication), optical imaging, laser based welding and cutting, optical sensing, focal length adjustment, games, scanning systems, spectroscopy, and fully or partially integrated laser based projection systems for portable and non-portable devices.

Unlike electrical phased arrays, the emitting elements of an optical phased-array are often placed multiple wavelength apart to compensate, for example, for small wavelength of light and routing challenges. A relatively large spacing between the emitting elements of an optical phased-array results in the presence of undesired side lobes in the far-field pattern, thereby limiting the steering range, and undesirable beam-width effect.

BRIEF SUMMARY OF THE INVENTION

An optical phase array, in accordance with one embodiment of the present invention, includes, in part, N optical signal emitting elements, and N lenses each associated with a different one of the N optical signal emitting elements and positioned to form an image of its associated signal emitting element. N is an integer greater than 1. In one embodiment, each of at least a subset of the N optical signal emitting elements is a grating coupler. In one embodiment, of at least a subset of the N optical signal emitting elements is an edge coupler.

In one embodiment, each of at least a subset of the N lenses is formed from Silicon. In one embodiment, the optical phased array further includes, in part, a concave lens positioned between the N signal emitting elements and the N lenses. In one embodiment, the optical phased array further includes, in part, a convex lens positioned between the N signal emitting elements and the N lenses.

In one embodiment, the N optical signal emitting elements are formed in a silicon dioxide layer formed above a semiconductor substrate and the N lenses are formed from Silicon disposed above the silicon dioxide layer. In one embodiment, the N optical signal emitting elements are formed in a silicon dioxide layer formed above a semiconductor substrate, and the N lenses and the concave lens are formed from Silicon disposed above the silicon dioxide layer. In one embodiment, the N optical signal emitting elements are formed in a silicon dioxide layer formed above a semiconductor substrate, and the N lenses and the convex lens are formed from Silicon disposed above the silicon dioxide layer. In one embodiment, the N optical signal emitting elements receive an optical signal generated by the same source.

A method of generating a far-field radiation pattern, in accordance with one embodiment of the present invention, includes, in part, generating N optical signals each from a different one of N emitting elements, and directing the N optical signals toward N lenses each associated with a different one of the N optical signal emitting elements and positioned to form an image of the associated optical signal emitting element. N is an integer greater than 1.

In one embodiment, each of at least a subset of the N optical signal emitting elements is a grating coupler. In one embodiment, each of at least a subset of the N optical signal emitting elements is an edge coupler. In one embodiment, each of at least a subset of the N lenses is formed from Silicon.

In one embodiment, the method further includes, in part, positioning a concave lens between the N signal emitting elements and the N lenses. In one embodiment, the method further includes, in part, positioning a convex lens between the N signal emitting elements and the N lenses.

In one embodiment, the N optical signal emitting elements are formed in a silicon dioxide layer formed above a semiconductor substrate and the N lenses are formed from Silicon disposed above the silicon dioxide layer. In one embodiment, the N optical signal emitting elements are formed in a silicon dioxide layer formed above a semiconductor substrate, and the N lenses and the convex lens are formed from Silicon disposed above the silicon dioxide layer. In one embodiment. The N optical signal emitting elements are formed in a silicon dioxide layer formed above a semiconductor substrate, and the N lenses and the concave lens are formed from Silicon disposed above the silicon dioxide layer. In one embodiment, the method further includes, in part, supplying an optical signal to each of the N optical signal emitting from the same optical signal source.

BRIEF DESCRIPTION OF THE DRAWINGS

The present application contains at least one drawing executed in color. Copies of this patent application with color drawing(s) will be provided by the Office upon request and payment of the necessary fee.

DETAILED DESCRIPTION OF THE INVENTION

Figure 1:
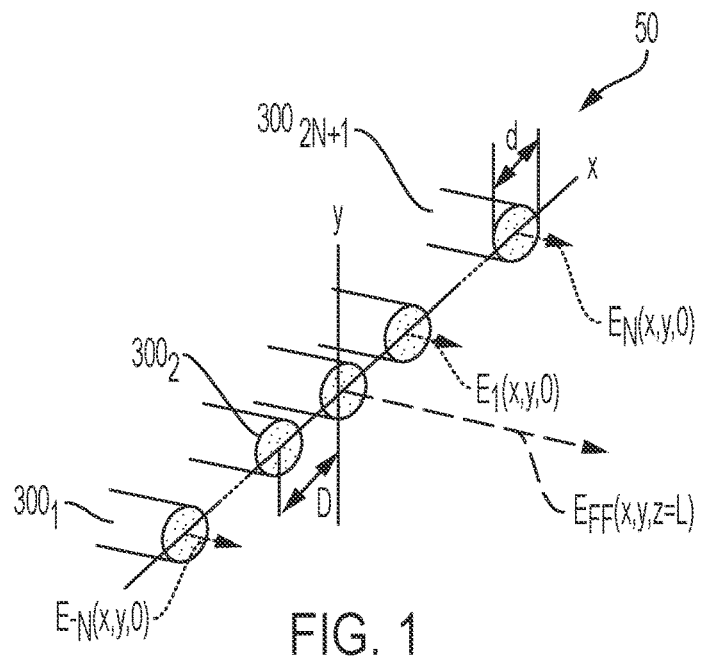
FIG. 1 shows a one-dimensional array of collimated optical signals.

FIG. 1 shows a one-dimensional optical phased array 50 having $2N+1$ collimated optical signal emitting elements $300_1, 300_2 \ldots 300_{(2N+1)}$ travelling along the z axis. Each optical signal emitting element is shown as having a diameter d, and spaced away from an adjacent optical signal emitting element by distance D along the x-axis. Assume that each optical signal emitting element has a Gaussian profile, and has the same wavelength $\lambda_0$ with the same optical power $P_0$. Accordingly, the electric field at the point of emission for each beam may be obtained using the following expression:

$$E_n(x, y, 0) = E_0 e^{jn\phi} e^{\frac{-4}{d^2}[(x-nD)^2+y^2]} \quad (1)$$

where $E_0$, n, and $\emptyset$ are respectively the electric field constant, element index, and the constant phase difference between adjacent elements.

Applying the Fraunhofer far field approximation, the far field intensity of the electric field at distance $z=L$ may be determined using the following:

$$I(x, y, L) = \frac{E_0^2 d^4}{\lambda_0^2 L^2} \left| W\left(\frac{2\pi d}{\lambda_0 L}x, \frac{2\pi d}{\lambda_0 L}y\right)\right|^2 \left| G\left(\frac{2\pi d}{\lambda_0 L}x - \phi\right)\right|^2 \quad (2)$$

$$W(k_x, k_y) = \mathcal{F}\left[e^{\frac{-4}{d^2}[(x-nD)^2+y^2]}\right], \quad G(\Omega) = \sum_n^N = -N e^{-jn\Omega},$$

where and $\mathcal{F}$ represents the 2D Fourier transform, respectively. Expression (2) may be further simplified to:

$$I(x, y, L) = \frac{E_0^2 d^4 \pi^2}{16\lambda_0^2 L^2} e^{\frac{-\pi^2 d^2}{2\lambda_0^2 L^2}(x^2+y^2)} \times \frac{\sin^2\left[(2N+1)\frac{\pi D}{\lambda_0 L}x - \frac{\phi}{2}\right]}{\sin^2\left[\frac{\pi D}{\lambda_0 L}x - \frac{\phi}{2}\right]} \quad (3)$$

As is seen from expression (3), the electric field intensity of at any point L may be varied by varying $\emptyset$, which is the difference between phases of adjacent beams. The Fourier transform of the profile of the individual beams defines the envelope (proportional to $$\frac{\lambda_0 L}{d})$$

within which the beam may be steered.

Due to finite size of the optical phased array 50 and periodic nature of $G(\Omega)$, side lobes appear in the far field pattern. The position of the main lobe and the position of its adjacent side lobes may be calculated from Expression 3. The ratio between the main lobe and the adjacent side lobe, commonly referred to as the side lobe suppression ratio (SLSR), may be calculated using the following expression:

$$SLSR = \frac{I(x_{main}, y, L)}{(x_{side}, y, L)} \quad (4)$$

Using Expressions 3 and 4, the maximum steering angle for a given SLSR may be substantially defined as:

$$\phi_{max} = \left[1 - \frac{2}{\pi^2}\left(\frac{D}{d}\right)\ln(SLSR)\right]\pi \quad (5)$$

Figure 2A:
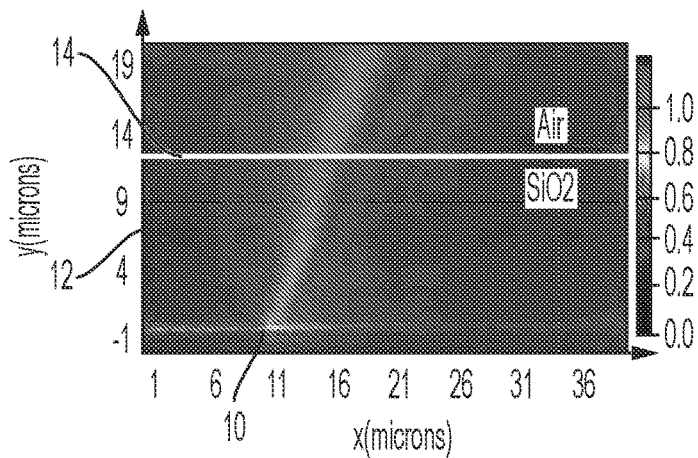
FIG. 2A shows an optical signal emitted by a grating coupler and refracted at the interface of Silicon dioxide and air, as known in the prior art.
Figure 2B:
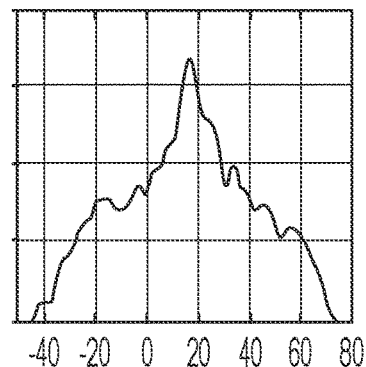
FIG. 2B shows a far field pattern of the beam emitted by the grating coupler of FIG. 2A, as known in the prior art.

FIG. 2A shows a grating coupler 10 formed in a Silicon dioxide material 12 and emitting a beam that is shown as being refracted at the interface 14 of Silcom dioxide material 12 and free space, as known. Grating coupler 10 may be an emitting element of an optical phased array. FIG. 2B shows the far field pattern of the beam emitted by grating coupler 10.

In accordance with one embodiment of the present invention, each beam emitting element of an optical phased array, such as grating coupler, an edge coupler, or the like, includes a beam enhancing element so as to increase the ratio $$\frac{d}{D},$$

as shown in Equation (5), and thereby increase the steering angle of the optical phased array.

Figure 3A:
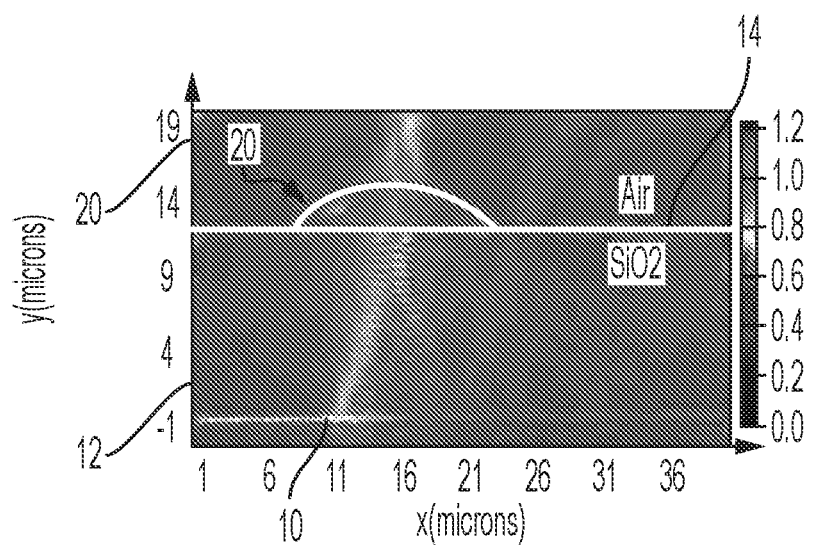
FIG. 3A shows an optical signal emitting element having an associated lens, in accordance with one embodiment of the present invention.
Figure 3B:
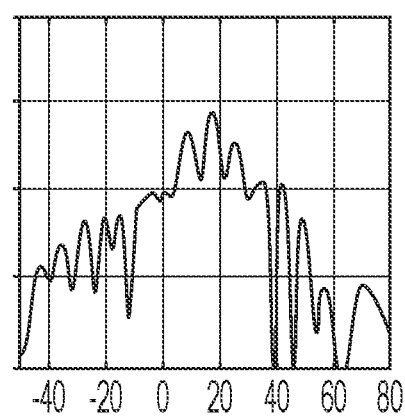
FIG. 3B shows a far field pattern of the beam emitted by the optical signal emitting element and its associated lens as shown in FIG. 3A.

FIG. 3A shows a grating coupler 10 formed in a Silicon dioxide material 12 and having an associated lens 20, in accordance with one embodiment of the present invention. The distance between grating coupler 10 and lens 20 is assumed to be greater than twice the focal length of lens 20. Optical lens 20 forms an image of the grating coupler on the convex side (i.e., in free space) of the lens, with the image being larger than the size of the grating coupler. FIG. 3B shows the far field pattern of the beam emitted by the combined grating coupler 10 and lens 20. As is seen by comparing FIGS. 3B and 2B, the far field beam-width of the grating coupler 10 having an associated lens 20, as shown in FIG. 3A, is advantageously wider than the far field beam-width of grating coupler 10 of FIG. 2A. Accordingly, as described further below, an optical phased array formed using a multitude of emitters each having an associated optical focusing element, such as a lens, has an enhanced beam steering range. In FIG. 3A, the lens is formed using Silicon. However, any other type of lens such as, metal photonic lens, Fresnel lens, photonic nano-crystals, trenches, grating structures, and the like may be used as a beam focusing element.

Figure 4A:
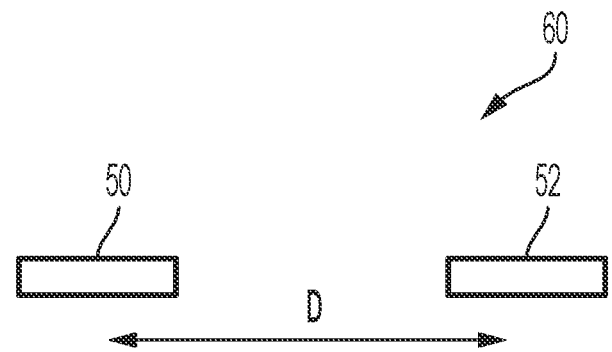
FIG. 4A is a simplified schematic diagram of an exemplary two-element optical phased array, as is known in the prior art.
Figure 4B:
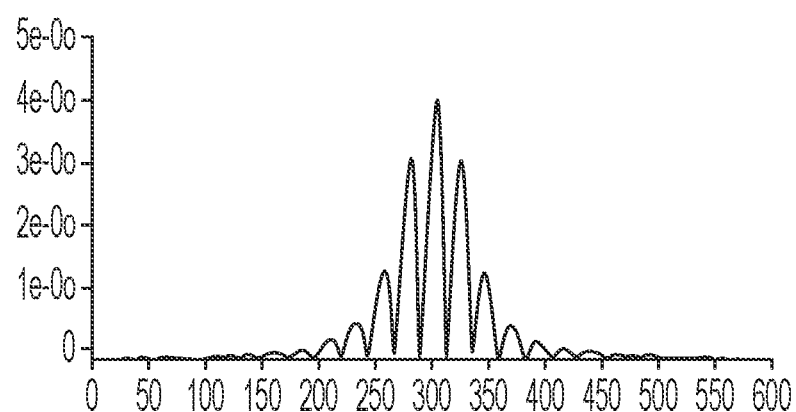
FIG. 4B is a far field radiation pattern of the optical phased array of FIG. 4A.

FIG. 4A is a simplified schematic diagram of an exemplary two-element optical phased array 60, as is known in the prior art. The distance between the centers of the emitting elements 50 and 52 is shown as being equal to D. FIG. 4B is a far field radiation pattern of optical phased array 60.

Figure 5A:
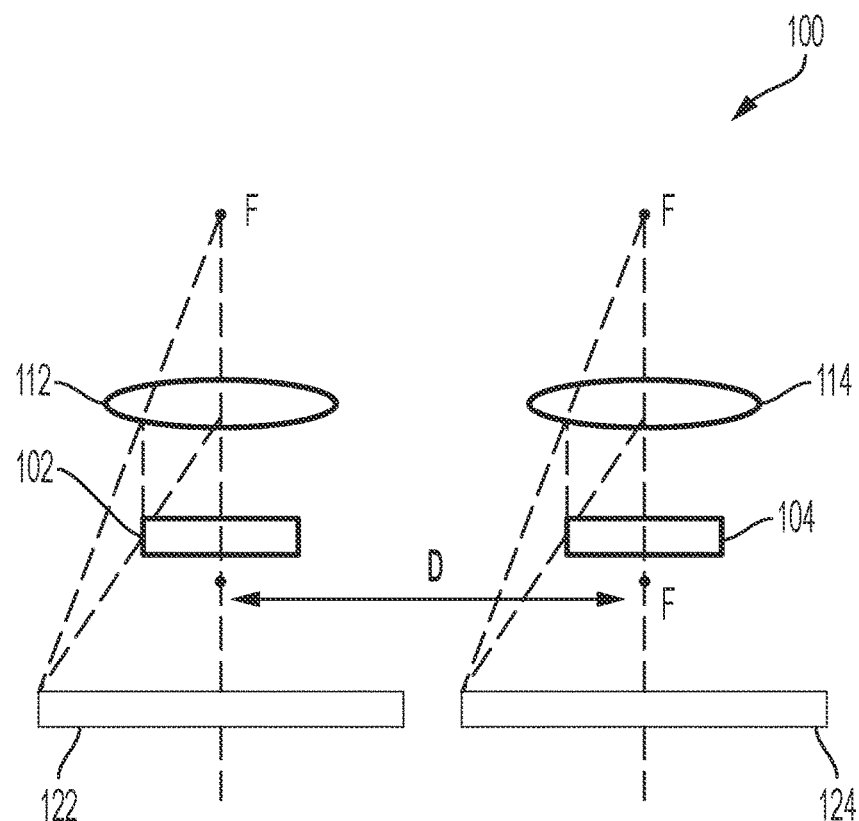
FIG. 5A is a simplified schematic diagram of an exemplary two-element optical phased array, in accordance with one embodiment of the present invention.
Figure 5B:
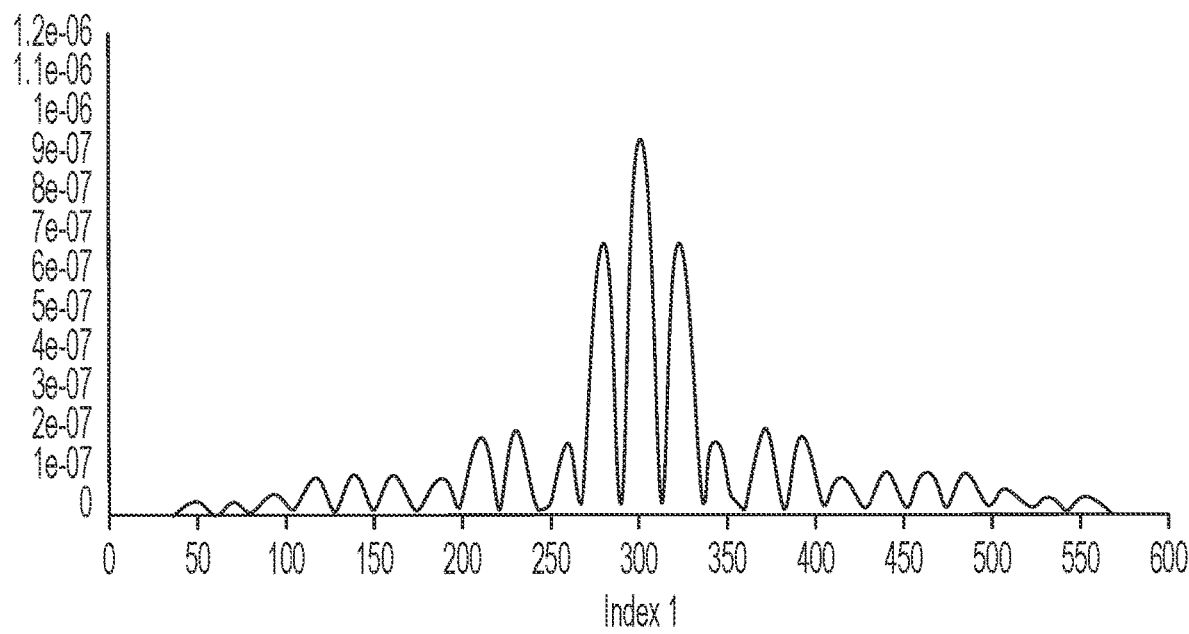
FIG. 5B is a far field radiation pattern of the optical phased array of FIG. 5A.

FIG. 5A is a simplified schematic diagram of an exemplary two-element optical phased array 100, in accordance with one embodiment of the present invention. Optical phased array 100 is shown as including optical emitting elements 102, 104, which may be grating couplers. Optical emitting element 102 is shown as having an associated concave lens 112, and optical emitting element 104 is shown as having an associated concave lens 114. The focal points of the lenses are identified using letter F. Therefore, optical emitting element 102 is shown as being disposed within the focal length of lens 112, thereby forming an image 122 of emitting element 102. Likewise, optical emitting element 104 is shown as being disposed within the focal length of lens 114, thus forming an image 124 of emitting element 104. As is seen from FIG. 5A, because images 122 and 124 of emitting elements 102 and 104 are larger than emitting elements 102 and 104 themselves (i.e., parameter d in equation (5)), the far-field radiation pattern of optical phased array 100 as shown in FIG. 5B has a substantially improved characteristics relative to the far-field radiation pattern of optical phased array 60 shown in FIG. 4B. The improved far field radiation pattern occurs despite the fact that the width of the emitting elements as well as the distance between each pair of adjacent emitting elements are the same in both phased arrays 60 and 100.

Figure 6A:
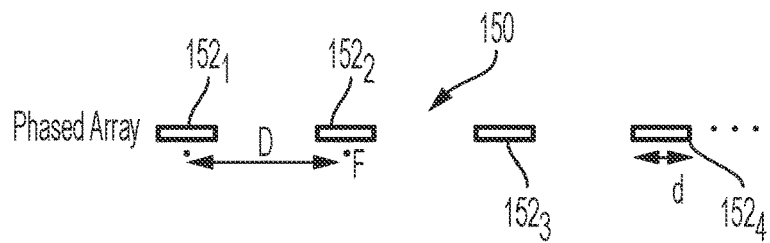
FIG. 6A is a simplified schematic diagram of an exemplary nine-element optical phased array, as known in the prior art.
Figure 6B:
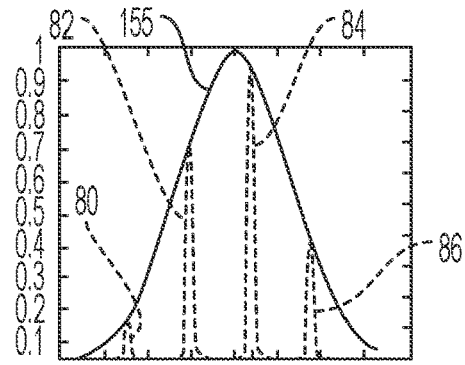
FIG. 6B is a far field radiation pattern of the optical phased array of FIG. 6A.

FIG. 6A is a simplified schematic diagram of an exemplary nine-element optical phased array 150, as known in the prior art. Optical phased array 150 includes nine optical emitting elements $152_i$, where i is an integer index ranging from 1 to 9. Only 4 of the emitting elements, namely $152_1$, $152_2$, $152_3$ and $152_4$ are shown in FIG. 6A. Each emitting element is shown as having a width d, and the distance between each pair of adjacent emitting elements, such as $152_1$ and $152_2$, is defined by D. FIG. 6B is a computer-simulated far-field radiation pattern of optical phased array 150. As is seen from FIG. 6B, this radiation pattern includes four lobes 80, 82, 84 and 86 collectively falling within envelope 155.

Figure 7A:
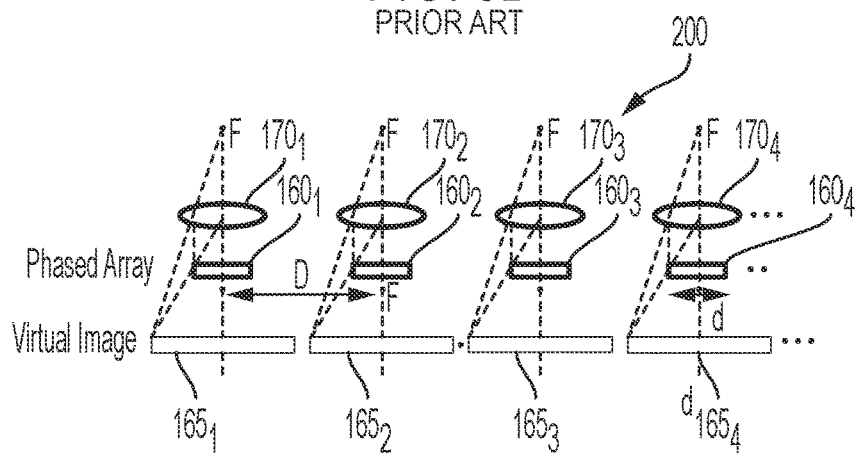
FIG. 7A is a simplified schematic diagram of an exemplary nine-element optical phased array, in accordance with one embodiment of the present invention.

FIG. 7A is a simplified schematic diagram of a nine-element optical phased array 200, in accordance with one exemplary embodiment of the present invention. Optical phased array 200 includes nine optical emitting elements $160_i$, where i is an integer index ranging from 1 to 9. Only 4 of the emitting elements, namely $160_1$, $160_2$, $160_3$ and $160_4$ are shown in FIG. 7A. Each emitting element is shown as having a width d, and the distance between each pair of adjacent emitting elements, such as $160_1$ and $160_2$, is defined by D.

Figure 7B:
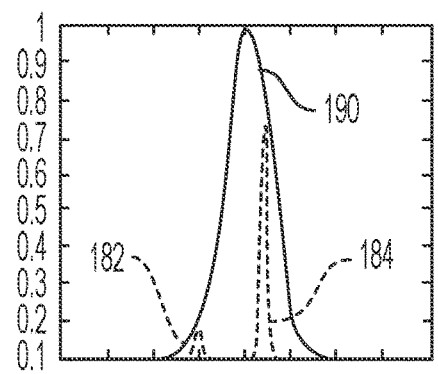
FIG. 7B is a far field radiation pattern of the optical phased array of FIG. 7A, in accordance with one embodiment of the present invention.

Associated with each emitting element $160_i$ is a concave lens $170_i$. Only 4 of the lenses, namely $170_1$, $170_2$, $170_3$ and $170_4$ that are associated respectively with emitting elements $160_1$, $160_2$, $160_3$ and $160_4$ are shown in FIG. 7A. Each emitting element $160_i$ is disposed within the focal length of its associated lens $170_i$, thereby forming an image $165_i$ as shown. The width (parameter d in equation (5)) of images $165_i$ of emitting elements is thus greater than the width of the emitting elements $160_i$. Accordingly, the far-field pattern of optical phased array 200 has an enhanced main lobe 184 and a side lobe 182 both falling within envelope 190. Comparing FIGS. 6B and 7B, it is seen that phased array 200 has a substantially improved far field radiation pattern than phased array 150. The improved far field radiation pattern occurs despite the fact that the width of the emitting elements as well as the distance between each pair of adjacent emitting elements are the same in both phased arrays 150 and 200.

Figure 8A:
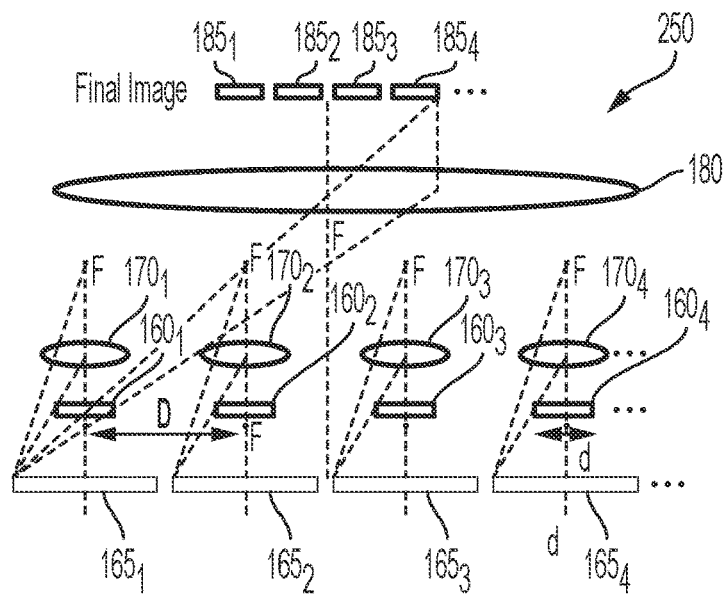
FIG. 8A is a simplified schematic diagram of an exemplary nine-element optical phased array, in accordance with another embodiment of the present invention.

FIG. 8A is a simplified schematic diagram of a nine-element optical phased array 250, in accordance with another embodiment of the present invention. Optical phased array 250 includes nine optical emitting elements $160_i$, where i is an integer index ranging from 1 to 9. Only 4 of the emitting elements, namely $160_1$, $160_2$, $160_3$ and $160_4$ are shown in FIG. 7A. Associated with each emitting element $160_i$ is a concave lens $170_i$. Only 4 of the lenses, namely $170_1$, $170_2$, $170_3$ and $170_4$ that are associated respectively with emitting elements $160_1$, $160_2$, $160_3$ and $160_4$ are shown in FIG. 7A. Each emitting element $160_i$ is disposed within the focal length of its associated lens $170_i$, thereby forming an image $165_i$ whose width is greater than the width of its associated emitting element $160_i$.

Figure 8B:
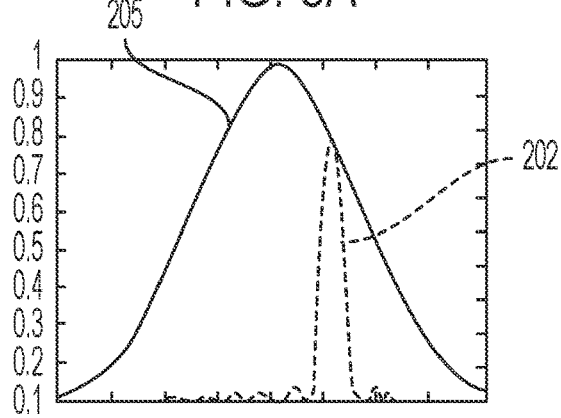
FIG. 8B is a far field radiation pattern of the optical phased array of FIG. 7A, in accordance with one embodiment of the present invention.

Also disposed in optical phased array 250 is a concave optical lens 180 positioned at more than twice its focal length away from images $165_i$. Optical lens 180 thus causes images $185_i$ to be formed at its focal line as shown in FIG. 8A. Only four of the images $185_1$, $185_2$, $185_3$ and $185_4$ are shown in FIG. 8A. As is seen, each image $185_i$ may have the same width as its associated emitting element $160_i$. However, the distance between each pair of adjacent images $185_i$ (such as the distance between images $185_1$, $185_2$) is shorter than the distance between their associated emitting elements $160_1$, $160_2$, thus giving rise to an improved far field characteristic of phased array 250. FIG. 8B shows the far-field radiation pattern of phased array 250. As is seen from FIG. 8B, the pattern substantially includes one main lobe 202 and a number of substantially degraded lobes all falling within envelop 205.

Figure 9:
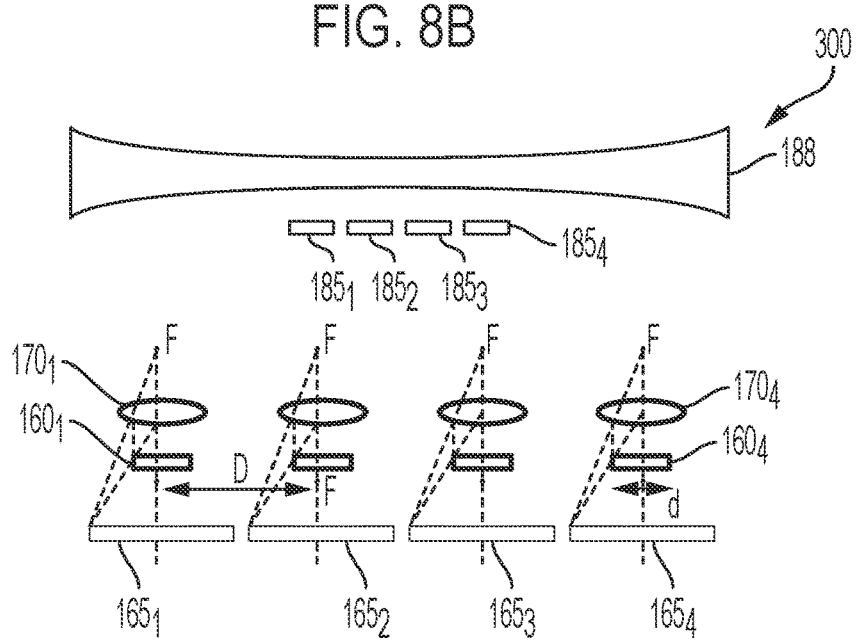
FIG. 9 is a simplified schematic diagram of an exemplary nine-element optical phased array, in accordance with another embodiment of the present invention.

FIG. 9 is a simplified schematic diagram of a nine-element optical phased array 300, in accordance with another embodiment of the present invention. Optical phased array 250 includes nine optical emitting elements $160_i$, where i is an integer index ranging from 1 to 9. Only 4 of the emitting elements, namely $160_1$, $160_2$, $160_3$ and $160_4$ are shown in FIG. 7A. Associated with each emitting element $160_i$ is a concave lens $170_i$. Only 4 of the lenses, namely $170_1$, $170_2$, $170_3$ and $170_4$ that are associated respectively with emitting elements $160_1$, $160_2$, $160_3$ and $160_4$ are shown in FIG. 7A. Each emitting element $160_i$ is disposed within the focal length of its associated lens $170_i$, thereby forming an image $165_i$ whose width is greater than the width of its associated emitting element $160_i$ Also disposed in optical phased array 300 is a convex optical lens 188 having a focal point longer than images $165_i$. Optical lens 188 thus causes images $185_i$ to be formed at its focal line as shown in Figure A. Only four of the images $185_1$, $185_2$, $185_3$ and $185_4$ are shown in FIG. 8A. As is seen, each image $185_i$ may have the same width as its associated emitting element $160_i$. However, the distance between each pair of adjacent images $185_i$ (such as the distance between images $185_1$, $185_2$) is shorter than the distance between their associated emitting elements $160_1$, $160_2$, thus giving rise to an improved far field characteristic of phased array 300.

Therefore, in accordance with embodiments of the present invention, using optical enhancement elements, either the effective width of an emitting element is increased, or the effective distance between each pair of adjacent emitting elements is decreased so as to increase the steering angle of the optical phased array. It is understood that an optical phased array, in accordance with the embodiment of the present invention may be formed in a substrate using conventional opto-electronics or photonics semiconductor processes.

An optical phased-array, in accordance with embodiments of the present invention, may be formed using a two-dimensional planar phased array in visible range or even invisible range when the phased array is adapted to perform frequency conversion. Multiple planar arrays emitting at different wavelengths may be stacked vertically to perform color combining per pixel thereby to form a projected colored image or video, in accordance with embodiments of the present invention. Moreover, in accordance with embodiments of the present invention, planar two-dimensional optical phased arrays may be tiled to form larger arrays or form a three dimensional image, video, or object in the space.

The above embodiments of the present invention are illustrative and not limitative. Embodiments of the present invention are not limited by the type of optical signal emitting element or lens disposed in a phased array. Embodiments of the present invention are not limited by the number of grooves in an optical grating coupler when optical gratings are used as optical signal emitting elements. Embodiments of the present invention are not limited by the wavelength of the optical signal, nor are they limited by the type of substrate, semiconductor or otherwise, in which the optical phased array may be formed. Embodiments of the present invention are not limited by the number of arrays used to form a two-dimensional array or the number of two-dimensional arrays used to a form a stack of three-dimensional array. Other additions, subtractions or modifications are obvious in view of the present disclosure and are intended to fall within the scope of the appended claims.

What is claimed is:

1. An optical phase array comprising:
a plurality of optical signal emitting elements;
a plurality of lenses each associated with a different one of the plurality of optical signal emitting elements and positioned to form an image thereof, wherein at least a first one of the plurality of optical signal emitting elements is a grating coupler; and
a concave lens positioned away from the plurality of signal emitting elements and the plurality of lenses.

2. The optical phased array of claim 1 wherein each of at least a subset of the plurality of lenses is formed from Silicon.

3. An optical phase array comprising:
a plurality of optical signal emitting elements;
a plurality of lenses each associated with a different one of the plurality of optical signal emitting elements and positioned to form an image thereof, wherein at least a first one of the plurality of optical signal emitting elements is a grating coupler; and
a convex lens positioned away from the plurality of signal emitting elements and the plurality of lenses.

4. The optical phased array of claim 1 wherein said plurality of optical signal emitting elements are formed in a silicon dioxide layer formed above a semiconductor substrate and said plurality of lenses are formed from silicon disposed above the silicon dioxide layer.

5. The optical phased array of claim 1 wherein said plurality of optical signal emitting elements are formed in a silicon dioxide layer formed above a semiconductor substrate, and wherein said plurality of lenses and the concave lens are formed from silicon disposed above the silicon dioxide layer.

6. The optical phased array of claim 3 wherein said plurality of optical signal emitting elements are formed in a silicon dioxide layer formed above a semiconductor substrate, and wherein said plurality of lenses and the convex lens are formed from silicon disposed above the silicon dioxide layer.

7. The optical phased array of claim 1 wherein each of the plurality of optical signal emitting elements receives an optical signal generated by a same source.

8. A method of generating a far-field radiation pattern, the method comprising:
generating a plurality of optical signals each from a different one of a plurality of optical signal emitting elements;
directing the plurality of optical signals toward a plurality of lenses each associated with a different one of the plurality of optical signal emitting elements and positioned to form an image of the associated optical signal emitting element, wherein at least a first one of the plurality of optical signal emitting elements is a grating coupler_and
positioning a concave lens away from the plurality of signal emitting elements and the plurality of lenses.

9. The method of claim 8 wherein each of at least a subset of the plurality of lenses is formed from silicon.

10. A method of generating a far-field radiation pattern, the method comprising:
generating a plurality of optical signals each from a different one of a plurality of optical signal emitting elements;
directing the plurality of optical signals toward a plurality of lenses each associated with a different one of the plurality of optical signal emitting elements and positioned to form an image of the associated optical signal emitting element, wherein at least a first one of the plurality of optical signal emitting elements is a grating coupler; and
positioning a convex lens away from the plurality of signal emitting elements and the plurality of lenses.

11. The method of claim 8 wherein said plurality of optical signal emitting elements are formed in a silicon dioxide layer formed above a semiconductor substrate and said plurality of lenses are formed from silicon disposed above the silicon dioxide layer.

12. The method of claim 8 wherein said plurality of optical signal emitting elements are formed in a silicon dioxide layer formed above a semiconductor substrate, and wherein said plurality of lenses and the convex lens are formed from silicon disposed above the silicon dioxide layer.

13. The method of claim 10 wherein said plurality of optical signal emitting elements are formed in a silicon dioxide layer formed above a semiconductor substrate, and wherein said plurality of lenses and the concave lens are formed from silicon disposed above the silicon dioxide layer.

14. The method of claim 8 further comprising supplying an optical signal to each of the plurality of optical signal emitting from a same optical signal source.

\* \* \* \* \*